(12) United States Patent
Maurilio

(10) Patent No.: US 6,709,263 B2
(45) Date of Patent: Mar. 23, 2004

(54) MOVEMENT APPARATUS FOR THE INJECTION ASSEMBLY OF A MOULDING MACHINE FOR PLASTICS

(75) Inventor: Meschia Maurilio, Usmate (IT)

(73) Assignee: Negri Bossi SPA, Cologno Monzese (Milan) (IT)

( * ) Notice: Subject to any disclaimer, the term of this patent is extended or adjusted under 35 U.S.C. 154(b) by 158 days.

(21) Appl. No.: 09/924,492

(22) Filed: Aug. 9, 2001

(65) Prior Publication Data
US 2002/0132026 A1 Sep. 19, 2002

(30) Foreign Application Priority Data
Mar. 15, 2001 (EP) .............................. 01830182

(51) Int. Cl.[7] .............................................. B29C 45/07
(52) U.S. Cl. ...................................... 425/574; 425/567
(58) Field of Search ................................. 425/567, 574

(56) References Cited

U.S. PATENT DOCUMENTS 4,676,730 A * 6/1987 Yamasaki .................... 425/569
6,039,559 A    3/2000 Eppich ........................ 425/574
6,432,333 B1 * 8/2002 Emoto ........................ 264/40.5
6,524,095 B1 * 2/2003 Ito et al. ...................... 425/574

FOREIGN PATENT DOCUMENTS

| EP | 62085915 | 4/1987 |
| JP | 2000071287 A | * 3/2000 |
| WO | WO 86/02591 | 5/1986 |

* cited by examiner

Primary Examiner—W. L. Walker
(74) Attorney, Agent, or Firm—Nixon & Vanderhye, P.C.; Frank P. Presta

(57) ABSTRACT

In a moulding machine for plastics comprising an injection assembly (1) mounted slidably on a frame of the machine and a moulding assembly (30) comprising a mould half (8) mounted on a fixed plate (6) integral with the machine frame, a movement apparatus (200) for the injection assembly comprises a chain transmission (209) connected to the injection assembly (1), a drive unit (211) that drives the chain transmission (209) to move the injection assembly (1) toward the moulding assembly (30) and return means (220) connected to the injection assembly (1) to allow the injection assembly (1) to be moved away from the moulding assembly (30).

9 Claims, 5 Drawing Sheets

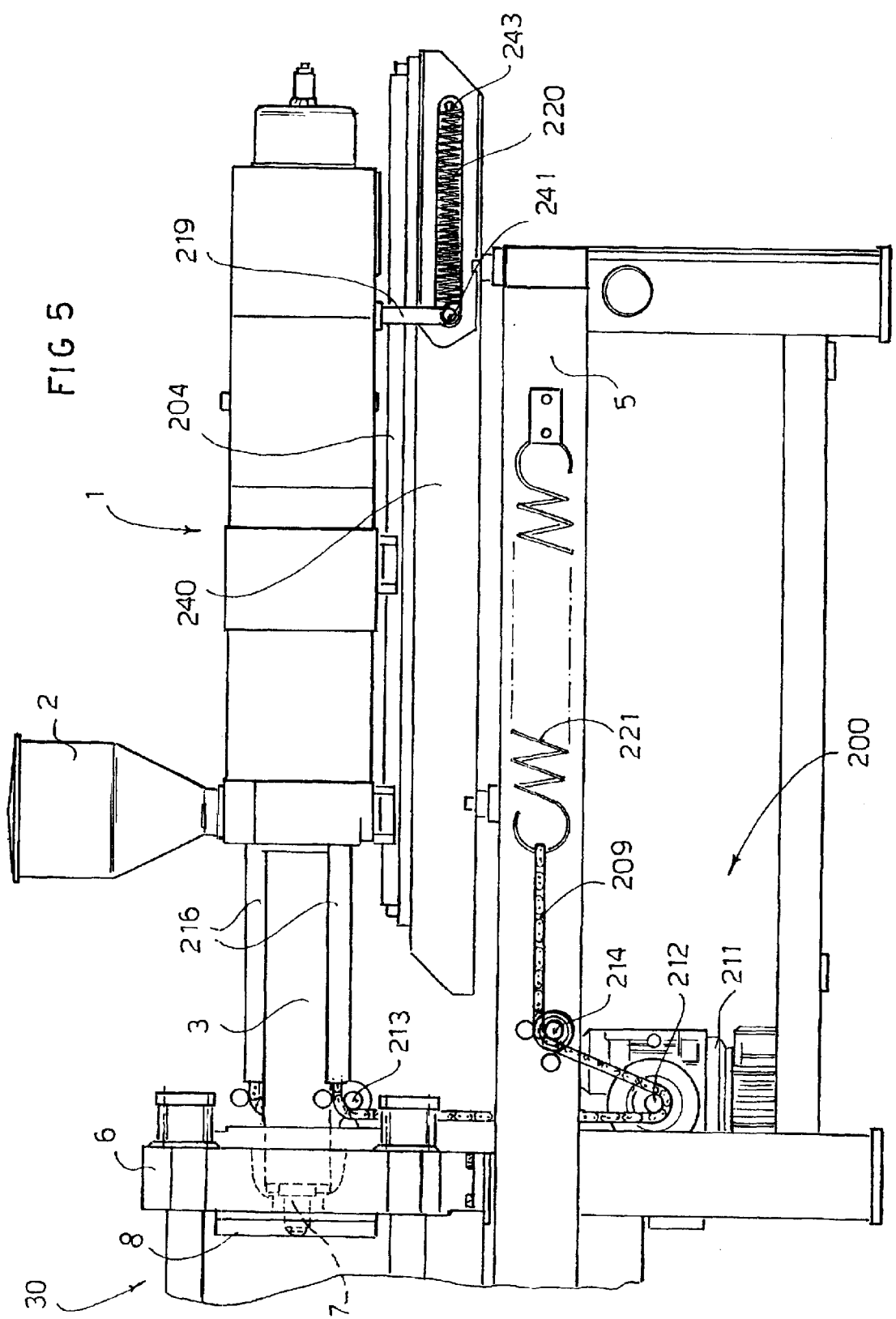

MOVEMENT APPARATUS FOR THE INJECTION ASSEMBLY OF A MOULDING MACHINE FOR PLASTICS

BACKGROUND OF THE INVENTION

1. Field of the Invention

The present invention refers to a driving or movement system for moving the injection assembly up to the mould closing assembly on injection moulding machines for plastics.

2. Description of Prior Art

According to the prior art, in the injection moulding procedure, use is made of injection moulding machines or apparatus wherein resins consisting of plastic materials are heated in order to be brought to a molten state in a heating barrel and are injected at high pressure into a cavity of a mould so as to fill it. The resin in the molten state is cooled inside the mould so as to harden and form the moulded product. At this point the mould is opened and the moulded product, which can be taken to storage or to subsequent processing stages, is ejected.

The injection moulding apparatus comprises an injection assembly and a moulding assembly. The injection assembly comprises a barrel externally heated by means of electric resistances and containing a plasticizing screw.

The plasticizing screw has two functions. In the first function the plasticizing screw, by rotating, conveys and plasticizes the material in the front part of the barrel. In the second function the plasticizing screw, by translating axially, transfers the material, by now in the molten state, from the barrel to the inside of the mould.

In particular the mould is divided into two mould halves mounted respectively on a fixed plate and on a movable plate. In this manner the mould can be opened and closed by moving the movable plate back and forth.

The moulding assembly comprises a double toggle mechanism that provides the movable plate with the movements necessary for opening/closing of the mould as quickly as possible. Furthermore the double toggle mechanism develops the mould closing force to be able to resist the pressure of the material during injection.

The two injection and moulding assemblies are disposed one in front of the other on a machine base. In particular, the injection assembly is not permanently constrained to said base. In fact it can slide on shoes or columns to translate back and forth to allow the injection nozzle to be moved away from or toward the mould.

By means of a driving apparatus the injection-plasticization assembly is given the motion of translation and a contact pressure between the injection nozzle and the mould is generated. Said contact pressure between nozzle and mould is necessary during injection of the plastic material to prevent the plastic material from escaping in the area of contact between the nozzle and the mould.

FIG. 1 shows schematically and partially a moulding machine according to the prior art comprising an injection and plasticization assembly 1 and a moulding assembly 30, shown partially. The machine has a movement apparatus for the injection assembly, according to the prior art, designated as a whole by reference numeral 100.

The moulding assembly 30 comprises a movable mould half, not shown, and a fixed mould half 8 mounted on a fixed plate 6 and in turn mounted integrally on a base 5 of the machine.

The injection assembly 1 comprises a hopper 2 into which solid plastic material is fed and a plasticizing barrel 3 inside which a plasticizing screw (not shown in FIG. 1) operates. The plasticizing barrel 3 ends in an injection nozzle 7 for injection of molten material into the mould.

The plasticizing assembly 1 is mounted slidably on profiled guides 4 provided on the base 5 of the moulding apparatus. In this manner the plasticizing assembly 1 can translate toward the moulding assembly 30. That is to say, the injection assembly 1 moves toward the fixed plate 6 until the injection nozzle 7 comes into contact with the fixed mould half 8.

Movement of the injection assembly 1 is achieved by means of the driving apparatus 100. The driving apparatus 100 has a transmission 109 with metal cables or ropes 109, 110 respectively connected to the front and rear part of the injection assembly 1.

The cables 109 and 110 extend respectively on pulleys 113 and 114 which are mounted on the fixed plate 6 of the mould and on the machine base 5, respectively. The cables 109 and 110 are driven by a common winding drum 112, in turn powered by an electric motor 111.

The phase of bringing the injection assembly 1 toward the moulding assembly 30 is obtained by winding the cables 109 on the drum 112 while the cables 110 are unwound. Vice versa for withdrawal of the injection assembly 1 from the moulding assembly 30 the direction of rotation of the electric motor 111 and thus of the drum 112 which causes winding of the cables 110 and unwinding of the cables 109 is inverted. Clearly the cables 109 and 110 can be parts of the same cable wound for a few turns on the winding drum 112.

The cables 109, in particular, are connected to the structure of the injection assembly 1 by means of small pistons 116 that act on a series of disc springs 115 provided in special cylindrical seats 131 of the injection assembly structure. The disc springs 115 when compressed make it possible to achieve the contact force necessary to hold the injection nozzle 7 against the fixed mould half 8 during injection of the plastic material. In fact, during this injection phase, the high pressure on the plastic material would lead to retraction of the injection assembly 1.

The movement apparatus 100 according to the prior art has various drawbacks due to slipping of the cables 109 and 110 under load and the problems relating to winding of the cables 109 and 110 on the pulleys 113 and 114 or on the small-diameter drums 112.

In fact, because of the high forces that have to be developed to maintain the contact between the injection nozzle and the mould, large-diameter cables must be provided, whereas because of problems of size the diameter of the idler pulleys and the winding drum cannot be increased too much.

In order to solve the problems of slipping between the cables and the pulleys, an alternative prior art solution provides for the cables 109 and 110 to be replaced with respective chains, maintaining the same structure of the movement system.

Both solutions, that providing for use of cables and that providing for use of chains, require adjustment of the movement system, so as not to create a backlash between the cable or chain and the pulley during reversal.

Moreover, both cables and chains must be long enough to be able to connect the front part and the rear part of the injection assembly, resulting in greater difficulty in driving or moving them.

SUMMARY OF THE INVENTION

The object of the invention is to eliminate the drawbacks of the prior art, providing an apparatus for moving the injection assembly that is able to ensure a high level of performance, allowing a high movement speed and a tight seal between the injection nozzle and the mould.

Another object of the present invention is to provide such a driving apparatus of the injection assembly that is reliable and able to reduce problems of jamming and adjustment of its mechanical components to a minimum.

Yet another object of the present invention is to provide such a driving apparatus for the injection assembly that is practical, economical, versatile and simple to make.

The movement apparatus for moving the injection assembly of a moulding machine, according to the invention, has an injection assembly slidably mounted on a machine base and driven or moved by means of a drive or movement unit that drives a metal chain transmission, in which one end of the chains is connected to the injection assembly. The other end of the chains is connected by means of spring means to a fixed frame of the machine.

The chains, driven by the drive unit, generate the forward movement of the injection assembly toward the moulding assembly, whilst the spring means keep the pull of the chains constant. The backward movement of the injection assembly away from the moulding assembly is generated by return means. Said return means are preferably extension spring means which connect the injection assembly to the frame of the machine.

However, the return means can also be another chain transmission driven by the same drive unit as the first chain transmission or by another drive unit.

The advantages of the movement apparatus of the injection assembly according to the invention are obvious. In fact, said movement apparatus allows the use of metal chains which ensure a greater reliability with respect to the metal cables used in the apparatus of the prior art.

Furthermore, the return means make it possible to avoid using long chains connected to the rear part of the injection assembly to allow its return.

Moreover, the spring means connected to one end of the chain make it possible always to keep the chain under tension, thus avoiding the creation of backlash between the chain and its driving sprocket wheels and therefore also the problems of jamming and adjustment of the transmission sprocket wheels of the chain.

DESCRIPTION OF THE DRAWINGS

Further characteristics of the invention will be made clearer by the detailed description that follows, referring to a purely exemplary and therefore non-limiting embodiment thereof, illustrated in the appended drawings, in which:

FIG. 5 is a view, as in FIG. 2, illustrating the injection assembly in the forward position.

DESCRIPTION OF THE PREFERRED EMBODIMENTS

Figure 1:
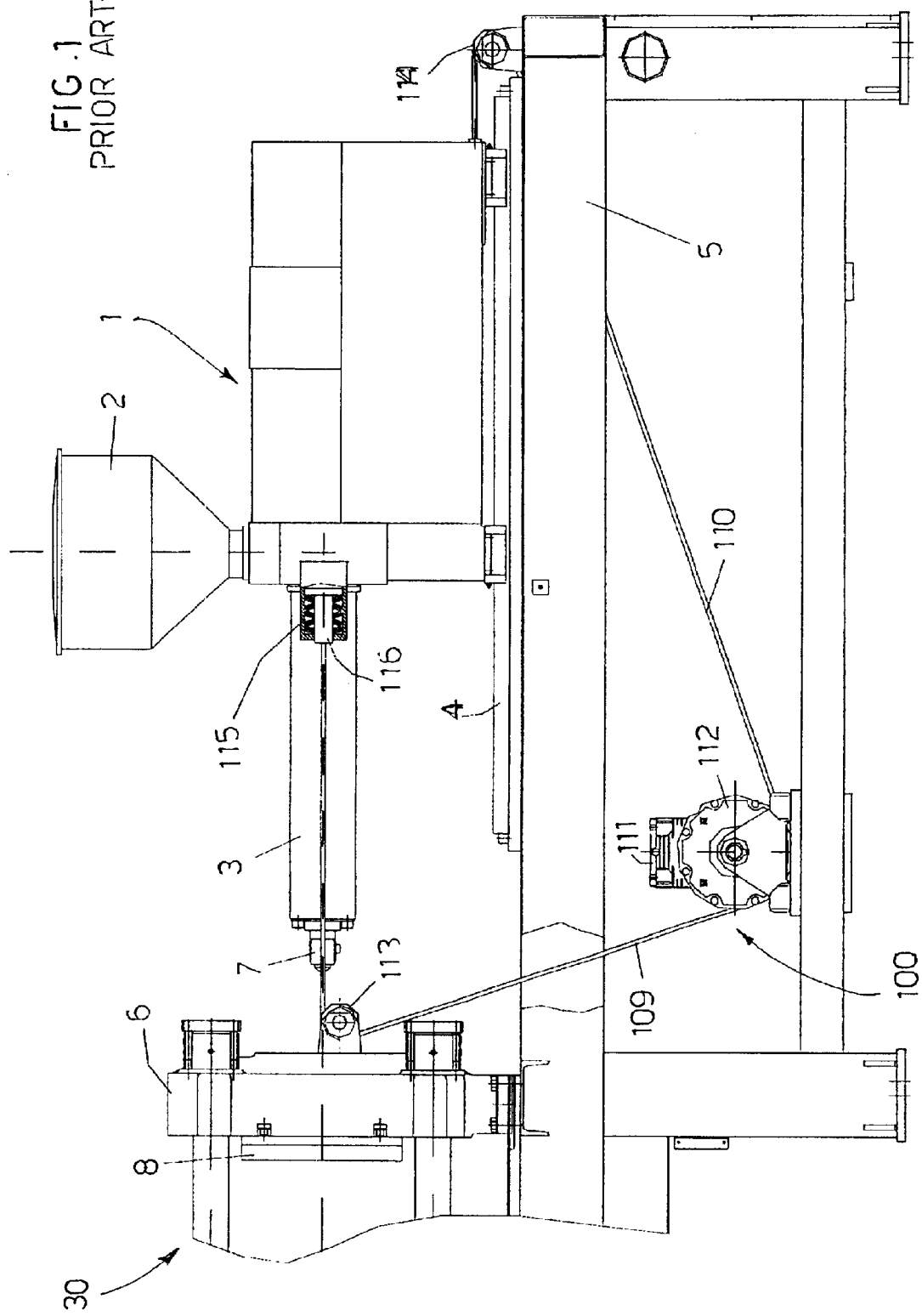
FIG. 1 is side elevational view, partially broken off and partially in section, illustrating an injection moulding machine with a driving apparatus for the injection assembly according to the prior art.

Hereinunder, elements like or corresponding to those illustrated in FIG. 1, relating to the moulding machine of the prior art, are designated with the same reference numerals and are not described.

Figure 2:
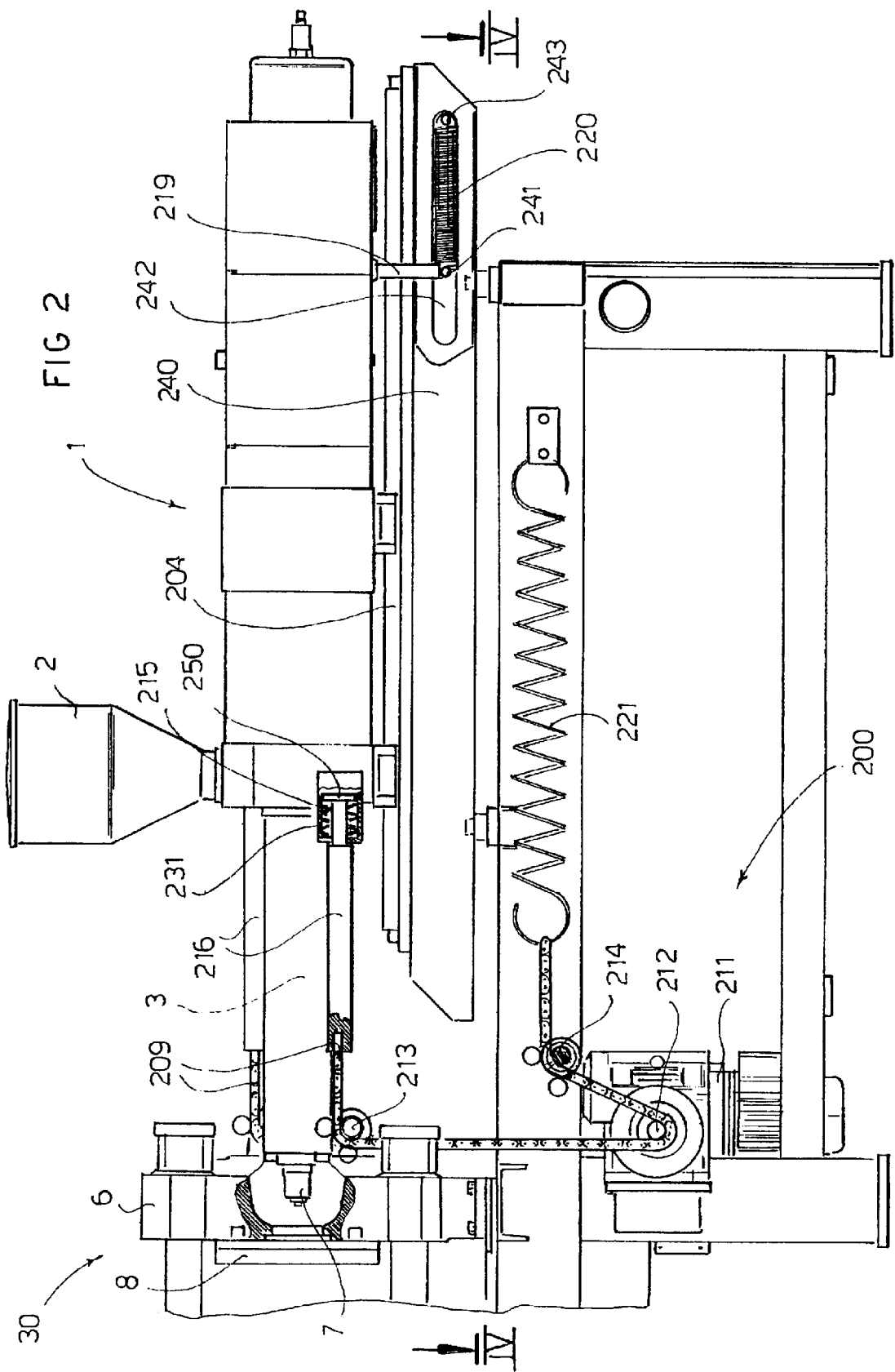
FIG. 2 is a side elevational view, like that in FIG. 1, partially broken off and partially in section, illustrating an injection moulding machine with a movement apparatus for the injection assembly according to the invention, in which the injection assembly is shown in a retracted position.

In FIG. 2 an injection moulding machine, substantially similar to the machine described with reference to FIG. 1, is shown schematically and broken off.

The moulding machine of FIG. 2 has a movement or driving apparatus for the injection assembly, according to the invention, designated as a whole with reference numeral 200.

Some elements making up the movement apparatus 200 are shown singly in FIG. 2, however they can be provided in pairs on the two sides of the machine. Therefore, even if reference will be made hereinunder to a single element, it must be considered that an identical element can be disposed symmetrically on the other side of the machine.

The injection assembly 1 is slidably mounted on a profiled guide 204 provided on a support 240 stationary mounted on the base 5 of the machine.

A bracket 219 which ends in a pivot or pin 241 slidably mounted in a slot 242 formed in the support 240 is fixed to the injection assembly 1. A spring 220 has one end engaged with the pin 241 and the other end engaged with a peg 243 fixed to the rear end of the support 240. The spring 220 is preferably a helical extension spring.

When the injection assembly 1 is in its retracted position (FIG. 2), that is to say, when the injection nozzle 7 is not engaged in the aperture of the fixed mould half 8, the spring 220 is not urged and the pin 241 is near to its rearward end of stroke inside the slot 242.

Figure 4:
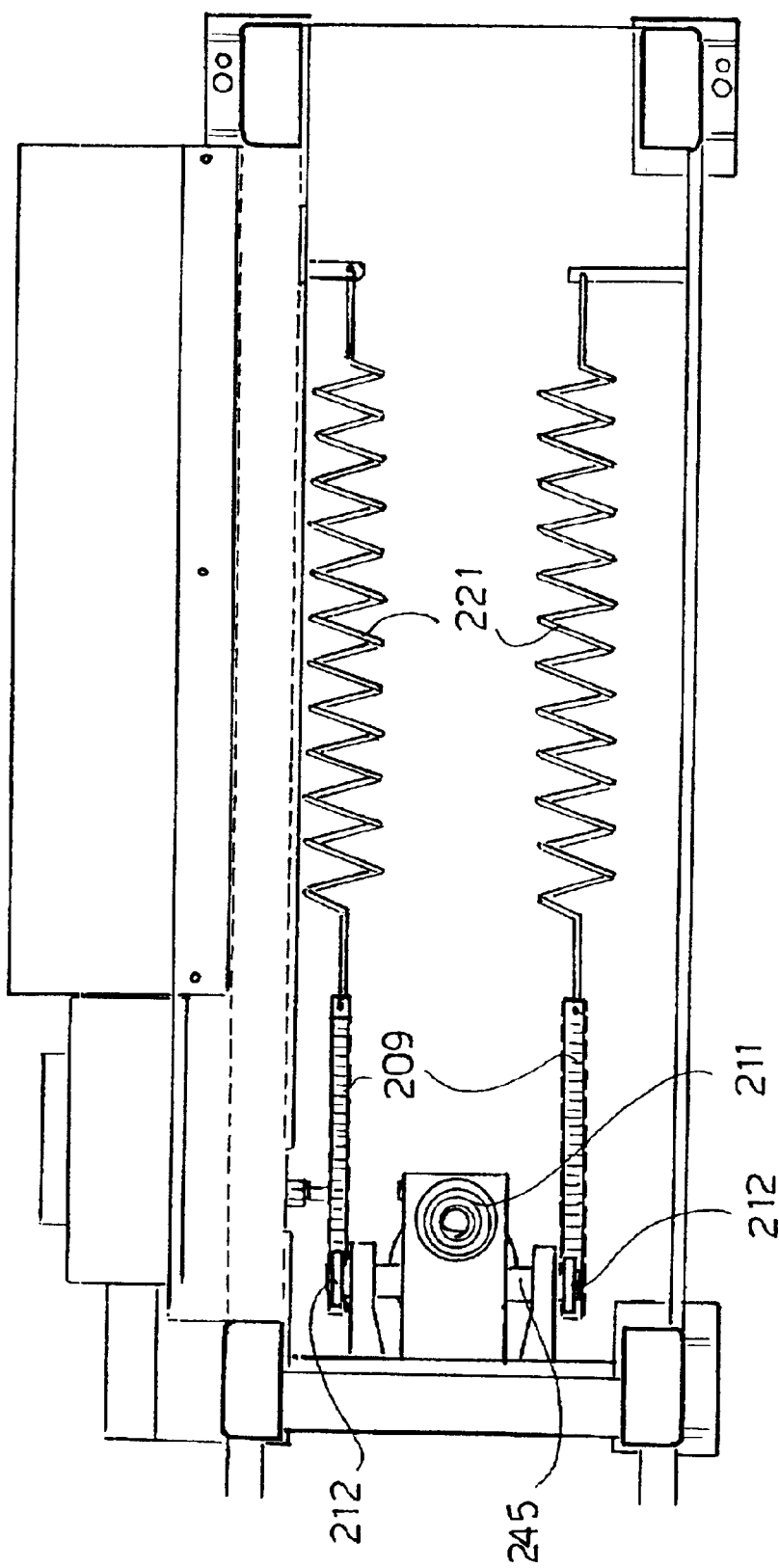
FIG. 4 is a sectional view along sectional plan IV—IV in FIG. 2.

A drive unit 211 rotates drive shaft 245 (FIG. 4) arranged transversally beneath the base 5. The drive unit 211 preferably has a worm screw geared motor. The output shaft 245 of the drive unit 211 is connected to two pinions 212 (FIG. 4). Each pinion 212 drives a chain 209 which extends on a first sprocket 213 rotatably mounted on the fixed plate 6 of the moulding assembly and on a second sprocket 214 rotatably mounted in the front side part of the machine base 5.

One end of the chain 209 is connected by means of a tie rod 216 to the injection assembly 1 and the other end of the chain 209 is connected by means of a spring 221 to the machine base 5.

Figure 3:
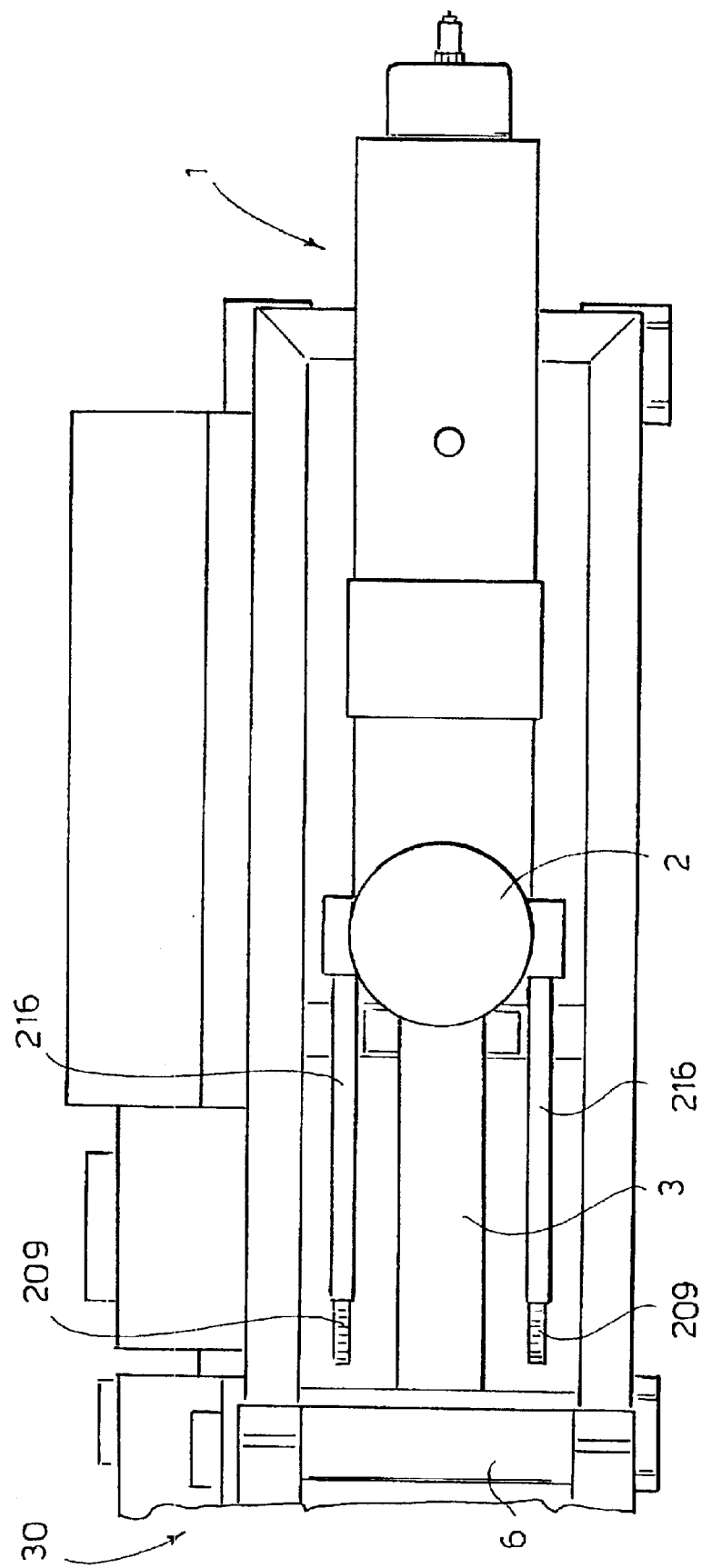
FIG. 3 is a top plan view from above of the moulding machine in FIG. 2, shown broken off.

As also shown in FIG. 3, each tie rod 216 has one end fixed to an end link of the chain 209 and the other end housed in a seat 231 of the injection assembly 1. A spring 215 which is interposed between the seat 231 and an end part 250 of the tie-rod 216 is positioned in the seat 231. The spring 215 is a disc compression spring or Belleville spring and provides contact pressure between the nozzle 7 and the mould 8 during the injection phase.

In each chain 209, the chain end opposite to the chain end engaged with the respective tie rod 216 is connected to an end of the spring 221. The spring 221 is a helical extension spring which serves to recover the chain 209 and always keep it under tension, avoiding disengagement thereof from the pinion 212.

As shown in FIG. 2, when the injection assembly 1 is in the retracted position, the spring 221 is extended and thus loaded so that it exerts a pulling force on the chain 209 which remains under traction.

Operation of the drive assembly 200 according to the invention is described below.

During the plasticizing stage, the injection assembly 1 is in its retracted position, shown in FIG. 2. When the plasticizing stage is completed, the driving apparatus 200 comes into operation to move the injection assembly 1 toward the moulding assembly 30.

For this purpose the electric motor 211 which rotates the pinions 212 in an anticlockwise direction (in FIG. 2) is actuated. The pinions 212 drive the respective chains 209 which, by means of tie rods 216, operate traction of the injection assembly 1. Consequently, the injection assembly 1 slides on the guides 204 to move toward the moulding assembly 30. At the same time the extension springs 221 recall the respective chains 209, keeping them under tension.

Since the injection assembly 1 moves forward, the bracket 219 moves forward with it, pulling the end of the spring 220 fixed to the pin 241 which moves forward in the slot 242 of the support 240. Consequently the spring 220 is loaded and extends.

FIG. 5 shows the injection assembly 1 in its advanced position, that is to say when the injection nozzle 7 is engaged against the half-mould 8.

In this situation the disc-shaped compression springs 215 are compressed and ensure the contact pressure between the nozzle 7 and the mould half 8, with such a force as to contrast the pulling action of the spring 220 and the reaction on the injection assembly exerted during the injection phase. The traction springs 221 are released and ensure tension of the chains 209. The pin 241 of the bracket 219 is at its forward end of stroke inside the slot 242 and consequently the extension spring 220 is loaded. The extension spring 220 which is loaded exerts a traction force on the bracket 219 which tends to cause the injection assembly 1 to retract. However, in this situation, thanks to the action of the motor brake of the geared motor 211, the traction force exerted by the spring 220 does not cause the injection group 1 to retract.

On completion of the injection phase, the injection assembly 1 must be moved away from the moulding assembly 30. For this purpose the geared motor 211 is actuated, so as to release the motor brake. Consequently the extension spring 220, which is loaded, tends to cause the injection assembly 1, which slides on the guides 204, to retract. At the same time the springs 221 extend and are thus loaded until the injection assembly 1 again reaches its retracted position, shown in FIG. 2.

During retraction of the injection assembly 1, the geared motor 211, instead of releasing its motor brake, can be driven in the opposite direction with respect to the direction of the advancement phase. In this manner the pinions are caused to rotate in a clockwise direction (FIG. 5).

Numerous variations and changes of detail within the reach of a person skilled in the art can be made to the present embodiment of the invention, without thereby departing form the scope of the invention set forth in the appended claims.

What is claimed is:

1. A movement apparatus (200) for the injection assembly of a moulding machine for plastics, the machine comprising an injection assembly (1) slidably mounted on a frame of the moulding machine and a moulding assembly (30) comprising a mould half (8) mounted on a fixed plate (6) integral to the machine frame, the driving apparatus (200) comprising a chain transmission (209) connected to said injection assembly (1), and a drive unit (211) which drives said chain transmission (209) to move the injection assembly (1) toward the moulding assembly (30), characterized in that it comprises return means (220) connected to said injection assembly (1) to allow the injection assembly (1) to be moved away from the moulding assembly (30), said return means comprising spring means (220) connected to said injection assembly (1) and to the fixed frame of the moulding machine.

2. A movement apparatus according to claim 1 characterized in that said spring means comprise at least one helical extension spring (220).

3. A movement apparatus according to claim 1, characterized in that said injection assembly (1) is mounted slidably on profiled guides (204) provided on a support (240) mounted stationary on a base (5) of the moulding machine frame.

4. A movement apparatus (200) for the injection assembly of a moulding machine for plastics, the machine comprising an injection assembly (1) slidably mounted on a frame of the moulding machine and a moulding assembly (30) comprising a mould half (8) mounted on a fixed plate (6) integral to the machine frame, the driving apparatus (200) comprising a chain transmission (209) connected to said injection assembly (1), and a drive unit (211) which drives said chain transmission (209) to move the injection assembly (1) toward the moulding assembly (30), characterized in that it comprises return means (220) connected to said injection assembly (1) to allow the injection assembly (1) to be moved away from the moulding assembly (30), said injection assembly (1) being mounted slidably on profiled guides (204) provided on a support (240) mounted stationary on a base (5) of the moulding machine frame, and said injection assembly (1) being connected to at least one bracket (219) which has an end pin (241) mounted slidably in at least one slot (242) formed in said support (240) and said spring means (220) have one end fixed to said pin (241) and the other end fixed to said support (240).

5. A movement apparatus (200) for the injection assembly of a moulding machine for plastics, the machine comprising an injection assembly (1) slidably mounted on a frame of the moulding machine and a moulding assembly (30) comprising a mould half (8) mounted on a fixed plate (6) integral to the machine frame, the driving apparatus (200) comprising a chain transmission (209) connected to said injection assembly (1), and a drive unit (211) which drives said chain transmission (209) to move the injection assembly (1) toward the moulding assembly (30), characterized in that it comprises return means (220) connected to said injection assembly (1) to allow the injection assembly (1) to be moved away from the moulding assembly (30), said chain transmission comprising at least one chain (209), driven by a pinion (212) of a shaft of said drive unit (211), in which one end of said chain (209) is connected to said injection assembly (1), and the other end is connected to the fixed frame of the moulding machine by spring means (221).

6. A movement apparatus according to claim 5, characterized in that said spring means which connect the end of said chain (209) to said base of the frame of the moulding machine, comprise at least one helical extension spring (221).

7. A movement apparatus according to claim 5, characterized in that said chain extends on a first wheel (213) rotatably mounted on said fixed supporting plate (6) of the fixed mould half (8)and on a second wheel (214) rotatably mounted on said base (5) of the frame of the moulding machine.

8. A movement apparatus according to claim 5, characterized in that said chain (209) is connected to said injection assembly (1) through interposition of a tie rod (216).

9. A movement apparatus according to claim 8, characterized in that said tie rod (216) has one end connected to the end of said chain (209) and another end (250) engaged in a seat (231) of said injection assembly (1), a disc compression spring or Belleville spring (215) being interposed between said seat (231) and said end (250) of the tie rod (216).

* * * * *